(12) United States Patent
Danboise (10) Patent No.: US 7,618,067 B2
(45) Date of Patent: Nov. 17, 2009

(54) WELDED DRAIN SPOUT

(76) Inventor: Scott Danboise, 8101 E. Michelle Dr., Scottsdale, AZ (US) 85255

( * ) Notice: Subject to any disclaimer, the term of this patent is extended or adjusted under 35 U.S.C. 154(b) by 347 days.

(21) Appl. No.: 11/458,913

(22) Filed: Jul. 20, 2006

(65) Prior Publication Data

US 2008/0018102 A1    Jan. 24, 2008

(51) Int. Cl.
*F16L 5/00* (2006.01)
(52) U.S. Cl. .................... 285/46; 285/141.1
(58) Field of Classification Search ............ 285/189, 285/193, 141.1, 136.1, 139.3; 52/220.8
See application file for complete search history.

(56) References Cited

U.S. PATENT DOCUMENTS

| | | | | |
|---|---|---|---|---|
| 1,548,570 | A * | 8/1925 | Wuesthoff | 285/137.11 |
| 1,562,982 | A * | 11/1925 | Muend | 285/18 |
| 1,602,248 | A * | 10/1926 | Page | 285/137.11 |
| 1,790,316 | A * | 1/1931 | Mueller | 285/137.11 |
| 1,790,317 | A * | 1/1931 | Mueller | 285/137.11 |
| 1,824,492 | A * | 9/1931 | Morris | 285/137.11 |
| 2,997,058 | A * | 8/1961 | Hall | 137/360 |
| 3,136,570 | A * | 6/1964 | Lee | 285/193 |
| 3,640,305 | A * | 2/1972 | Young | 137/360 |
| 4,163,572 | A | 8/1979 | Benscoter | |
| 4,171,005 | A * | 10/1979 | Nicklas | 137/467 |
| 4,715,624 | A | 12/1987 | Frye | |
| 4,823,409 | A * | 4/1989 | Gaffney et al. | 4/678 |
| 4,884,596 | A * | 12/1989 | Byers et al. | 137/801 |
| 4,962,904 | A | 10/1990 | Perry et al. | |
| 4,997,214 | A | 3/1991 | Reese | |
| 5,437,481 | A | 8/1995 | Spears et al. | |
| 5,988,692 | A | 11/1999 | Springer | |
| 6,276,004 | B1 * | 8/2001 | Bertrand et al. | 4/615 |
| 6,301,727 | B1 * | 10/2001 | Bertrand et al. | 4/678 |
| 6,334,463 | B1 * | 1/2002 | Lee | 137/801 |
| 6,751,978 | B1 | 6/2004 | Gagne et al. | |
| 6,840,267 | B1 * | 1/2005 | Jennings et al. | 137/360 |

OTHER PUBLICATIONS

Watts Drainage, RD-940 Downspout Nozzle, catalog specification sheet.
Zum, Z199 Downspout Nozzle, catalog specification sheet.
Tyler Pipe, No-Hub ASA Group 022 Pipe, catalog specification sheet.

* cited by examiner

*Primary Examiner*—David E Bochna
(74) *Attorney, Agent, or Firm*—Wenderoth, Lind & Ponack, L.L.P.

(57) ABSTRACT

A plumbing fitting that is formed so as to be capable of a quick connection to a plastic drainage pipe. The plumbing fitting can be attached to the drainage system with the final plumbing construction and avoids the need for a plumber to make any separate trips to the construction site during wall build out. The plumbing fitting includes a hollow metal spout that has a substantially cylindrical attachment area and a stop. A hollow plastic connector, substantially cylindrical in its outer surface, is attached to the metal spout by sliding the connector into the attachment area of the spout until the connector contacts the stop. The plastic connector can be attached to the spout by a friction or press fitting. The hollow plastic connector is itself formed in an inner surface so as to be capable of attachment to a drain pipe through standard solvent welded female-to-male quick connection.

18 Claims, 5 Drawing Sheets

WELDED DRAIN SPOUT

FIELD OF THE INVENTION

The present invention relates to a plumbing fitting. More particularly, the invention relates to a terminal plumbing spout that is attached to ABS or PVC pipe.

BACKGROUND OF THE INVENTION

Plastic materials are widely used in various plumbing applications. The various kinds of plastics that may be used include materials such as ABS and PVC materials. An advantage of plastic piping is the cost savings that can be realized from the use of inexpensive materials. Plastic pipe also offers labor advantages in that plastic materials can be quickly cut and assembled to fit the specifications of a given job. On the other hand, plastic pipe suffers from a drawback in the area of aesthetics; plastic pipe is not perceived as being attractive in its manufactured condition. Further, plastic materials can degrade when exposed to ultraviolet light such as sunlight. Hence, plastic pipe is often used in applications where it is hidden from sight. It is generally not desired to use plastic materials that will be visible and/or exposed to ultraviolet rays.

In the area of drainage control, spouts or nozzles may be specified with a high architectural value. These spouts are generally aesthetically pleasing as well as functional. The spouts function to direct water away from the building so as to avoid pooling of water near the foundation. The spouts are often highly visible and exposed to the elements. Thus, drain spouts are frequently formed, such as by casting, of an attractive metal or alloy such as bronze, brass, or aluminum.

However, a disadvantage of a metallic drain spout is the time and effort required to affix it to the upstream rainwater drainage system. For example, collection and gathering piping that leads drainage water to the downspout may be plastic pipe. As currently practiced, it requires a laborious and time consuming effort to connect the metal spout to the plastic pipe. One such method practiced is to use a coupling assembly. The coupling assembly is an additional, separate component from the spout and the drainage pipe. The coupling is affixed to both the pipe and the spout in order to provide a fluid path. It would be desired to find a quick and economical means of joining a metallic spout to plastic pipe that avoids the use of additional component pieces.

Present methods of attaching metallic drain spouts to plastic pipe are also time consuming for an additional reason. Frequently a plumber must make a trip to the construction site while the wall where the spout will be attached is being built. This is so that the plumber can coordinate with the mason or builder where the wall line will be, information that is needed in order to properly rough in the spout for a clean finish product. This trip to fit the spout is frequently a separate trip that cannot be combined with the more typical rough plumbing and finish plumbing trips that a plumber makes to the construction site. Thus it would be desired to develop a new drain spout and method of attachment that avoids the necessity of extra construction trips.

Additionally, the present method of attaching metal spouts results in wasted space. It is frequently desired to save the space required in wall thickness, for example, so that the building owner achieves a higher occupancy square footage and/or reduced construction materials. It would be desired to develop a drain spout that minimizes the required thickness for a wall that contains the drain pipe to which the spout is attached.

Hence there has been identified a need to provide an improved method and means for connecting metal drain spouts to plastic drainage pipe. It is desired that the method and means be compatible with existing plumbing methods and materials. It is also desired that the method be relatively inexpensive and quick to apply. It is further desired that the method be designed so that it will provide a robust and firm attachment to the pipe. Finally, it is further desired that the method and means achieve cost and performance advantages over alternative linkage methods. The present invention addresses one or more of these needs.

SUMMARY OF THE INVENTION

In one embodiment, and by way of example only, there is provided a plumbing fitting for providing a quick connection between a drainage spout and a plastic drain pipe. The fitting includes a hollow spout portion and a hollow plastic connector portion. The plastic connector portion is firmly affixed to the spout portion as by a friction or press fitting. The plastic connector is adapted to bond with the plastic drain pipe. The plumbing fitting may further include an escutcheon attached to the spout portion; the escutcheon may be a separate tapered escutcheon. The plastic connector comprises either a PVC or ABS material. The spout portion comprises a bronze alloy, brass alloy, aluminum, or aluminum alloys. The plastic connector portion may further define a hollow, substantially cylindrical area, formed so as to provide a female-to-male connection with the drain pipe.

In a further embodiment, and still by way of example, there is provided a plumbing component that is capable of quick connection to a plastic drainage pipe that includes a hollow metal spout defining a stop and an attachment area and a hollow plastic connector attached to the metal spout so that the plastic connector is in contact with the stop and the attachment area of the metal spout. The attachment area of the metal spout may define a substantially cylindrical surface area, and the plastic connector may define a substantially cylindrical exterior surface such that the surface area of the plastic connector contacts the attachment area of the spout when the plastic connector is attached to the spout. The hollow plastic connector may be configured so as to join to the plastic drainage pipe as the female portion in a male-to-female attachment. The plumbing component may also be configured so that the metal spout and plastic connector define a substantially planar fitting surface.

In still a further embodiment, and still by way of example only, there is provided a method for connecting a drainage spout assembly to a plastic drain pipe wherein the spout assembly includes a plastic connector attached to a metallic spout. The method includes the steps of applying solvent weld material to contact areas on the connector; and joining the spout assembly to the plastic drain pipe so that contact areas on the connector make contact with reciprocal contact areas on the plastic drain pipe. The method may also include the step of allowing a solvent weld to form while maintaining the spout assembly and drain pipe in a desired relative position. The method may further include a step of dry fitting the spout assembly to the plastic drain pipe and measuring a final position for the spout assembly relative to the plastic drain pipe. Finally, the method can also include a step for trimming the plastic drain pipe to a desired length in order to obtain the desired final positioning of the spout assembly on the drain pipe.

Other independent features and advantages of the welded drain spout will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

Figure 1:
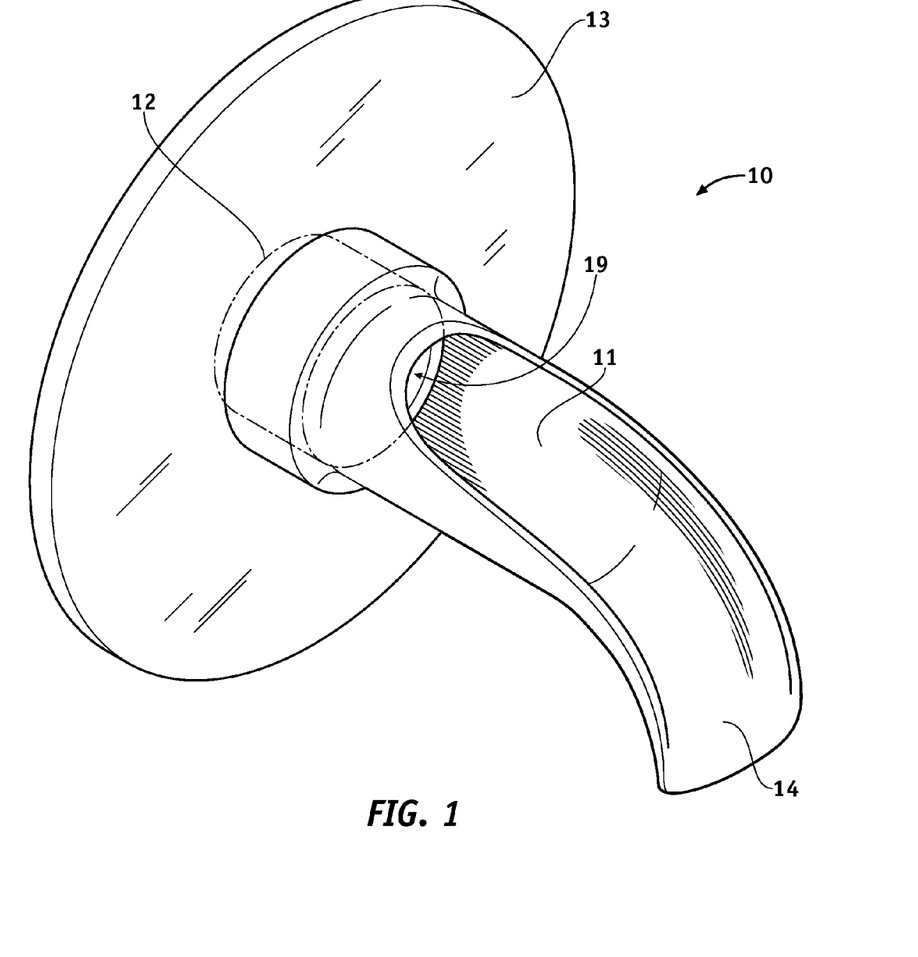
FIG. 1 is a perspective view of a nozzle assembly according to an embodiment of the present invention.

Referring now to FIG. 1 there is illustrated an exemplary embodiment of a plumbing adapter assembly according to one embodiment of the present invention. As shown in FIG. 1, the assembly 10 includes spout 11 and connector 12 (shown in cross hatching). Spout 11 and connector 12 are preferably connected so as to form a single unitary piece. Assembly 10 may also include skirt or escutcheon 13. Escutcheon 13 may be a separate piece, or, in other embodiments escutcheon 13 is also a unitary piece with spout 11. Assembly 10 is generally hollow in shape, defining passage 19, so as to allow fluid, such as water, to flow therethrough.

Still referring to FIG. 1, spout 11 is generally shaped so as to provide a method of directing fluid that flows through assembly 10. Spout 11 may be provided with a lip 14. While spout 11 may take a variety of configurations, in a preferred embodiment spout 11 and lip 14 have a curved shape so as to efficiently direct water therethrough and away from any structure to which assembly 10 is attached. Spout 11 may be manufactured from a variety of materials. Rigid materials that provide the structural integrity to act as a drain downspout are preferred. Metallic materials including metals and metal alloys are also preferred materials of construction for spout 11 both for their mechanical properties and architectural aesthetics. Thus, for example, spout 11 may be formed of metallic materials such as bronze alloys, brass alloys, aluminum, and aluminum alloys.

Figure 5:
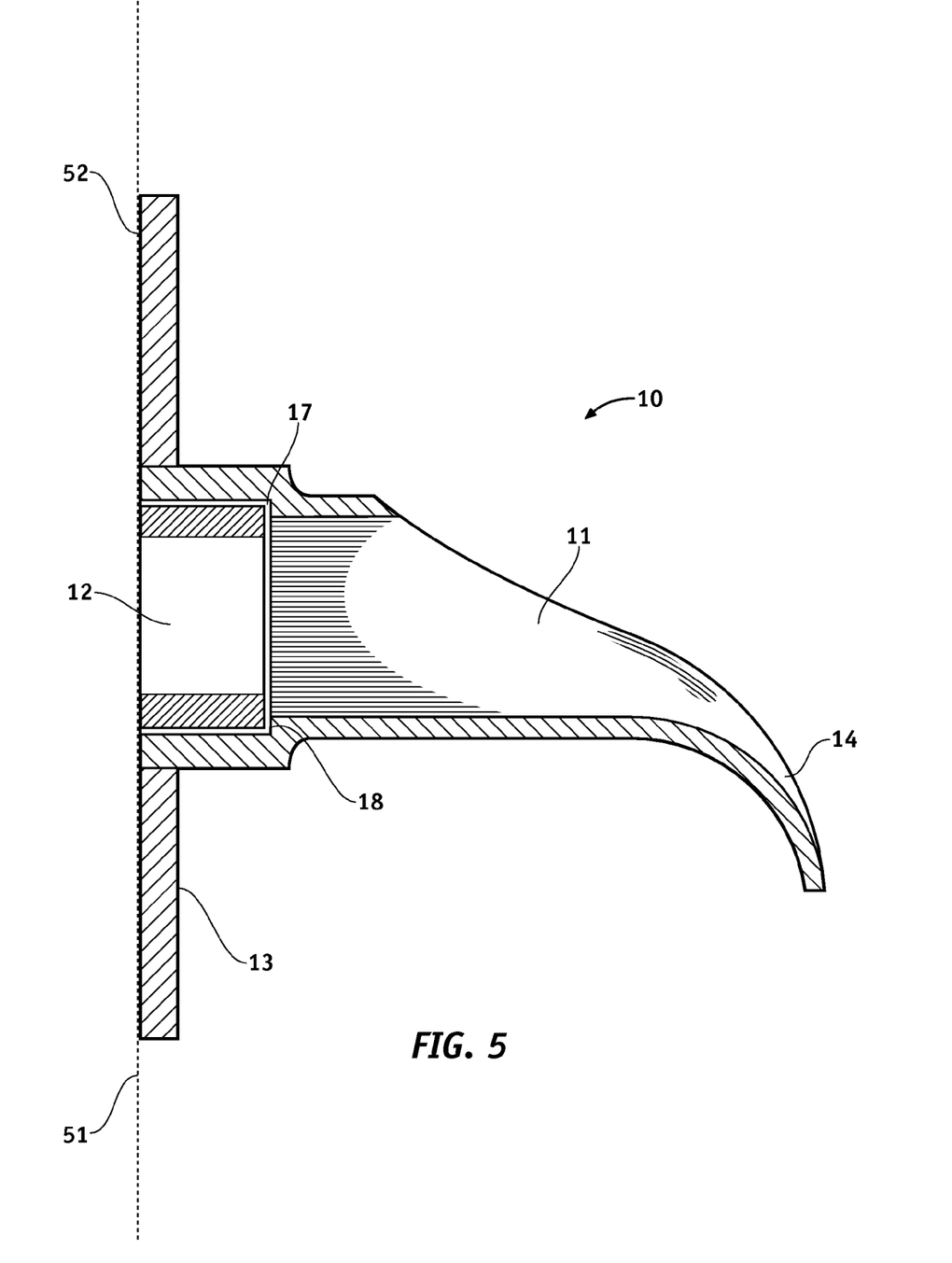
FIG. 5 is a profile view of a nozzle assembly according to an embodiment of the present invention.

In one embodiment spout 11 is formed so as to have a recessed area 17 (as shown in FIG. 5) into which connector 12 may be fitted. In those embodiments where connector 12 is generally circular in cross-section, spout 11 is also formed with a cylindrical area with a dimension so that connector 12 can slide into recessed area 17. Recessed area 17 can take any shape so as to accommodate spout 11. Further, it is preferred to form spout 11 with a stop 18 at one end of recessed area 17.

During the construction of assembly 10, stop 18 acts as a limit of movement for connector 12 within recessed area 17. The shape and dimension of recessed area 17 and stop 18 can be selected so that connector 12, when joined with spout 11, extends a desired amount from spout 11.

Still referring to FIG. 1, connector 12 provides a linkage between the spout 11 and other drainage structures. Preferably connector 12 comprises a plastic material. Acceptable plastic materials include any plastic material useful in plumbing and/or drainage applications. Thus, for example, polyvinyl chloride (PVC) plastics and acrylonitrile butadiene styrene (ABS) plastics may be used, as non-limiting examples, of materials to form connector 12. It is generally preferred that the material for connector 12 be selected so as to be compatible with the drainage pipe to which it is intended that connector 12 be connected, as explained further herein. The degree of compatibility preferred between connector 12 and drainage pipe is just the compatibility necessary to form a bond for drain water purposes. The physical shape of connector 12 can vary; in a preferred embodiment connector 12 takes the shape of a hollow cylinder.

Figure 2:
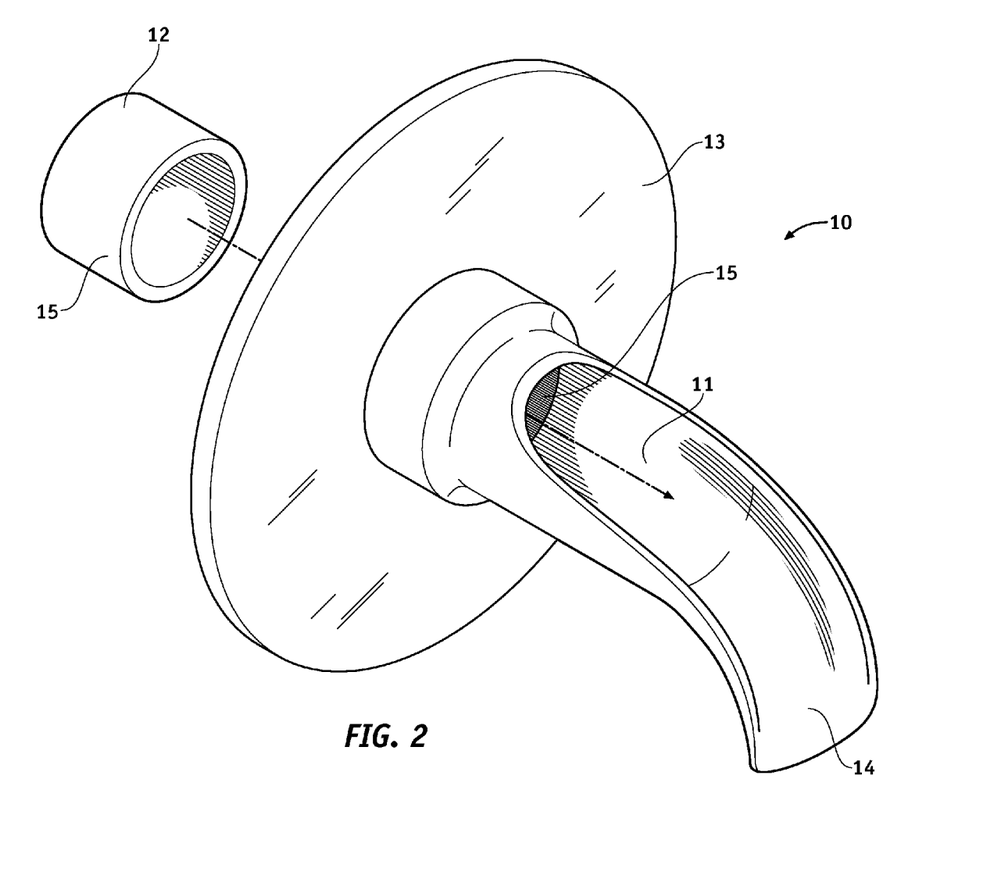
FIG. 2 is an exploded view of a nozzle assembly, according to an embodiment of the present invention.

Referring now to FIG. 2 there is shown an exploded view of assembly 10. FIG. 2 thus illustrates one exemplary way of joining spout 11 with connector 12 through a press fitting. In the embodiment of FIG. 2, both spout 11 and connector 12 have reciprocal bonding areas 15. Bringing the connector 12 into contact with spout 11 brings the reciprocal bonding areas 15 into close contact. Through proper manufacturing tolerances, the contact between the reciprocal bonding areas forms a press fitting that securely holds spout 11 to connector 12 sufficient for purposes of assembly 10 functioning as a drainage spout. As is understood in the art, o-rings, gaskets and other devices may be used to create a fit at the bonding areas 15 that minimizes water leakage therethrough when connector 12 and spout 11 are attached.

A press fitting has been described as a preferred method of joining spout 11 and connector 12 so as to form assembly 10, and this form of joinder should provide an inexpensive yet sufficiently robust means of attachment between plastic and metallic materials for the intended purpose. Yet other forms of joinder may be employed, and the disclosure should not be read as limited to a press fitting. Thus, for example, joinder methods such as adhesion may also be employed to attach spout 11 and connector 12. Adhesion methods include epoxying or gluing plastic to metal.

Referring now to FIG. 5 there is shown a profile view of assembly 10. FIG. 5 illustrates a preferred embodiment of assembly 10 where the fitting edge 52 of assembly 10 is approximately planar as illustrated through dotted line 51. The fitting edge 52 is that edge of assembly 10 that will be placed in close proximity to a building structure, such as an exterior wall, when assembly 10 is finally attached to a drainage pipe. The fitting edge 52 of the preferred embodiment is described as approximately planar because some deviation from strict planarity is acceptable for the performance desired. For example fitting edge 52 may have some angularity or curvature, for example a concavity or convexity. Nevertheless, as exterior walls with which the assembly 10 will be used are flat (or approximately flat), a relatively planar shape is preferred so that assembly 10 will fit closely against the building. FIG. 5 also indicates that preferred embodiment in which connector 12 does not extend beyond line 51. It should be noted that assembly 10 can be used even with exterior walls that are not flat, as for example walls constructed of rough hewn stone.

Figure 3:
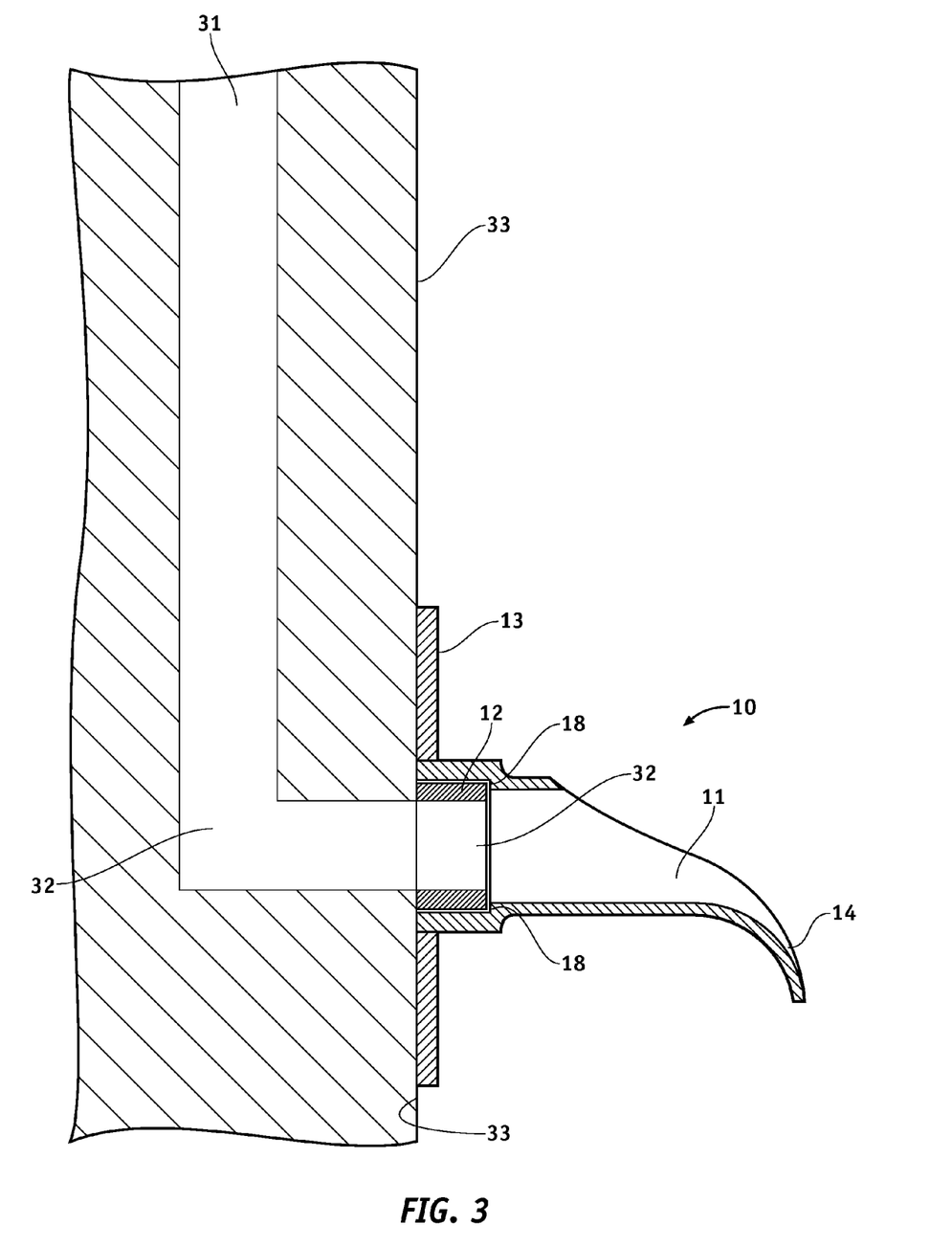
FIG. 3 is a perspective view of a nozzle assembly affixed to a drainage system, according to an embodiment of the present invention.

Referring now to FIG. 3 there is shown an exemplary embodiment of assembly 10 affixed to a drainage pipe. As is understood in the art, a drainage system to manage rain water falling on a structure such as a building or house may include a combination of items such as channels, valleys, gutters, collection pipes, etc. In some systems water at some elevated position, a flat roof for example, is then directed to a generally vertically aligned leader 31. The leader 31, for aesthetic or code reasons, may be hidden within the building structure, such as behind the exterior wall 33 of the building. The leader 31 generally functions to carry the water from the higher position (near the roof) to a lower position (near the ground) via gravitational forces where the water may then be directed away from the building. As shown in FIG. 3, leader 31 may be connected to elbow 32 so as to allow the water to transition from flowing in a generally vertical direction to a more horizontal direction. Elbow 32 may itself be connected to further piping that extends to a position that is proximate to an outer boundary of the building. An aperture 33 in the building structure allows piping to pass through the building. The drainage system has been described here in general terms, and it will be understood by those skilled in the art that a drainage system may differ from that precisely presented here. Nevertheless, the type of drainage system to which the present invention finds particular application includes those systems that have a generally horizontally aligned drainage pipe that terminates proximate to the exterior wall of the building. In such systems it is advantageous to attach assembly 10 to the drainage system to as to provide an exit spout for water flowing through the drainage system.

Still referring to FIG. 3, connector 12 of assembly 10 is shown as attached to elbow 32. More particularly, connector 12 is shown as forming the female portion, and elbow 32 is shown as forming the male portion, in a male-to-female type quick connection. Elbow 32 extends through aperture 33, past exterior wall 33, and joins with connector 12. That portion of elbow that passes into connector 12 is shown in dotted lines in FIG. 3. Such connections may also be referred to as hub-pipe connections in the plumbing industry. The opposite arrangement is also possible, where connector 12 forms a male portion, and the pipe to which it is attached provides the female portion of the connection. By virtue of the fact that connector 12 is formed with a compatible plastic material, a quick plastic-to-plastic bond may be formed between connector 12 and elbow 32 (or any other piping to which connector 12 is attached). Thus, as is known in the art, for example with respect to PVC pipe, a bond may be formed by the solvent weld technique. This generally involves spreading a material (or multiple materials) that promotes the solvent weld over those surfaces that are to be brought into contact. The two pipe portions are then slid into position thereby bringing the contact surfaces into contact. The solvent weld material then quickly bonds the two pipe portions together. It is to be understood that a solvent weld material is any material, or combination of materials, that promotes the plastic to plastic bond known in the plumbing art. For example a first primer material may be used in conjunction with a second glue material to form the solvent weld material. Thus it is to be understood that this term is also meant to include those systems where a chemical reaction is promoted between the two plastic substrates that are to be joined. Again, the plastic-to-plastic bond is sufficient so that the system, including drainage pipes and assembly 10 functions as a drainage system. Preferably the plastic-to-plastic bond minimizes any water leakage between the joint formed between the joined pieces.

While the solvent weld method is preferred, it should also be understood that other gluing or adhesive techniques may be used to join the assembly 10 to a drain pipe. For example, epoxy glue may be used for this joining purpose. As will be described further herein, the solvent weld method is advantageous as providing a quick connection between plastic components.

One advantage of the assembly 10 described herein lies in the relative quickness with which it may be attached to commonly-used plastic drainage pipes. In those assemblies 10 that include a skirt 13, it is generally desired in good construction practices to bring the skirt 13 into a close contact with the exterior surface of the building wall. Skirt 13 provides a visually pleasing coverage of aperture 33 while also providing the function of physically covering aperture 33 so as to restrict the passage of debris or animals into the building interior. In the construction process, the joinder between assembly 10 and elbow 32 (or other pipe) may be measured, as by a dry fitting, so that the final joinder will place skirt 13 into the desired position. Then, if needed, a trimming of plastic material—preferably from the drainage pipe—may be performed. It is submitted that in practice a plumber or builder will find it much more convenient to trim the drainage pipe, and not connector 12. After any necessary trimming the final attachment can be performed. In summary, the assembly 10 converts the attachment of an ornamental architectural spout into a simple plastic-to-plastic attachment. Assembly 10 thereby avoids the usage of cumbersome sleeves or couplings that were heretofore practiced with metal spouts. In some embodiments skirt 13 may be tapered in order to fit against a wall, especially, for example, in any case where the spout cannot be placed in close proximity to a wall.

One preferred embodiment has been described in which spout 12 is formed of a metallic material. Metallic materials find some preference in the marketplace due to their desired architectural appearance and robust structure. However, in a further embodiment assembly 10 may be formed of a single piece of plastic. However, plastic materials are not preferred due to the potential for ultraviolet degradation.

Figure 4:
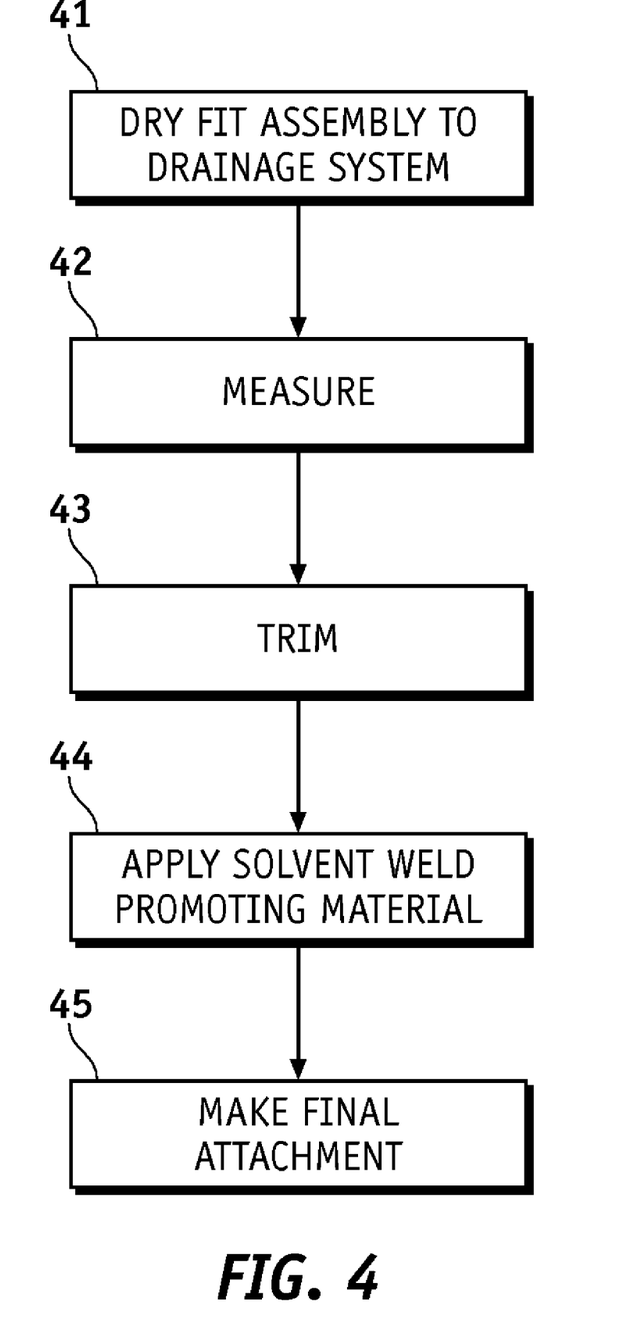
FIG. 4 is a functional block diagram showing steps in a method of attaching a nozzle assembly to a drainage system, according to an embodiment of the present invention.

Referring now to FIG. 4 there is shown a functional block diagram of the steps in one method of attaching assembly 10 to a pipe of a drainage system. In step 41 assembly 10 is first dry fitted to the drainage system pipe. In step 42 a measurement is taken of where the assembly 10 is to be finally fitted on the pipe. This may be done by holding the assembly and making a marking on the drainage pipe to which it will be attached. In optional step 43 the pipe is trimmed so that the assembly 10 can be affixed to the pipe at a desired final position. In step 44, solvent weld material is applied to the reciprocal contact surfaces of assembly 10 and the pipe. Finally, in step 45 the final attachment of assembly 10 to the pipe is performed. Generally, a final attachment is achieved by positioning the pieces in their desired position and holding them in alignment for a desired period of time. Frequently, in plastic-to-plastic attachments the time needed to hold the pieces together is short, less than a few minutes (typically between about 15 to about 30 seconds), so that the solvent weld material (or adhesive) sufficiently sets or cures so as to restrict the pieces from moving out of alignment.

The above steps in the method of attachment are a quick connection method for attaching a spout to a drain pipe. The quick connection is noted as not involving reciprocal threading in attaching to the drain pipe. Nor does the quick connection method involve the use of a coupling attached to the drain pipe. Rather the quick connection follows a male-to-female attachment (also referred to in the plumbing industry as hub-pipe) between plastic pieces using solvent welding of the plastic pieces.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A plumbing fitting for providing a quick connection to a plastic drain pipe, the plumbing fitting comprising:
   a hollow metal spout portion; and
   a hollow plastic connector portion firmly affixed to the metal spout portion,
   wherein the plastic connector portion is adapted to bond with the plastic drain pipe,
   wherein the plumbing fitting has a first end to be bonded to the plastic drain pipe and a second end opening directly to an exterior of the plumbing fitting,
   wherein the plastic connector portion and the metal spout portion are configured and arranged so as to form an unobstructed passage for drainage through the plumbing fitting from the first end to the second end, and
   wherein the plastic connector portion is firmly affixed to the metal spout portion by gluing.

2. The plumbing fitting according to claim 1, wherein the plastic connector portion is firmly affixed to the metal spout portion by press fitting.

3. The plumbing fitting according to claim 2, further comprising an escutcheon attached to the metal spout portion.

4. The plumbing fitting according to claim 1, wherein the plastic connector portion comprises a material selected from the group consisting of PVC and ABS.

5. The plumbing fitting according to claim 1, wherein the metal spout portion comprises a material selected from the group consisting of bronze alloys, brass alloys, aluminum, and aluminum alloys.

6. The plumbing fitting according to claim 1, wherein the plastic connector portion further defines a hollow, substantially cylindrical area, formed so as to provide a female-to-male connection with the plastic drain pipe.

7. The plumbing fitting according to claim 1, wherein the plastic connector portion is inserted into the metal spout portion so that an end of the plastic connector portion is flush with an end of the metal spout portion at the first end of the plumbing fitting.

8. A plumbing component capable of quick connection to a plastic drainage pipe, the plumbing component comprising:
   a hollow metal spout defining a stop and an attachment area; and
   a hollow plastic connector attached to the metal spout so that the plastic connector is in contact with the stop and the attachment area of the metal spout,
   wherein the plumbing component has a first end to be bonded to the plastic drainage pipe and a second end opening directly to an exterior of the plumbing component,
   wherein the plastic connector and the metal spout are configured and arranged so as to form an unobstructed passage for drainage through the plumbing component from the first end to the second end, and
   wherein the plastic connector is inserted into the metal spout so that an end of the plastic connector is flush with an end of the metal spout at the first end of the plumbing component.

9. The plumbing component according to claim 8,
   wherein the attachment area of the metal spout defines a substantially cylindrical surface area, and
   wherein the plastic connector defines a substantially cylindrical exterior surface such that the substantially cylindrical exterior surface area of the plastic connector contacts the attachment area of the metal spout when the plastic connector is attached to the metal spout.

10. The plumbing component according to claim 9, wherein the plastic connector is configured so as to join to the plastic drainage pipe as the female portion in a male-to-female attachment.

11. The plumbing component according to claim 8, wherein the plastic connector defines a substantially cylindrical inner surface area that is configured so as to join to the plastic drainage pipe as the female portion in a male-to-female quick connection.

12. The plumbing component according to claim 8, wherein the plastic connector comprises a material selected from the group consisting of PVC and ABS.

13. The plumbing connector according to claim 8, wherein the metal spout comprises a material selected from the group consisting of bronze alloys, brass alloys, aluminum, and aluminum alloys.

14. The plumbing component according to claim 8, wherein the plastic connector comprises a material that is capable of being solvent welded to the plastic drainage pipe.

15. A plumbing fitting for providing a quick connection to a plastic drain pipe, the plumbing fitting comprising:
   a hollow metal spout portion; and
   a hollow plastic connector portion firmly affixed to the metal spout portion,
   wherein the plastic connector portion is adapted to bond with the plastic drain pipe,
   wherein the plumbing fitting has a first end to be bonded to the plastic drain pipe and a second end opening directly to an exterior of the plumbing fitting,
   wherein the plastic connector portion and the metal spout portion are configured and arranged so as to form an unobstructed passage for drainage through the plumbing fitting from the first end to the second end,
   wherein the metal spout portion defines a stop configured to prevent relative motion of the plastic connector portion toward the second end of the plumbing fitting, and
   wherein the plastic connector portion has a first end flush with a first end of the metal spout portion at the first end of the plumbing fitting, and the plastic connector portion has a second end contacting the stop.

16. A plumbing fitting for providing a quick connection to a plastic drain pipe, the plumbing fitting comprising:
   a hollow metal spout portion; and
   a hollow plastic connector portion firmly affixed to the metal spout portion,
   wherein the plastic connector portion is adapted to bond with the plastic drain pipe,
   wherein the plumbing fitting has a first end to be bonded to the plastic drain pipe and a second end opening directly to an exterior of the plumbing fitting,
   wherein the plastic connector portion and the metal spout portion are configured and arranged so as to form an unobstructed passage for drainage through the plumbing fitting from the first end to the second end,
   wherein the plastic connector portion is cylindrical,
   wherein the plastic connector portion is arranged within the metal spout portion so that an outer circumferential surface of the plastic connector portion directly contacts the metal spout portion, and wherein the first end of the plastic connector portion is flush with an end of the metal spout portion at the first end of the plumbing fitting.

17. A plumbing component capable of quick connection to a plastic drainage pipe, the plumbing component comprising:
    a hollow metal spout defining a stop and an attachment area; and
    a hollow plastic connector attached to the metal spout so that the plastic connector is in contact with the stop and the attachment area of the metal spout,
    wherein the plumbing component has a first end to be bonded to the plastic drainage pipe and a second end opening directly to an exterior of the plumbing component,
    wherein the plastic connector and the metal spout are configured and arranged so as to form an unobstructed passage for drainage through the plumbing component from the first end to the second end,
    wherein the stop is configured to prevent relative motion of the plastic connector toward the second end of the plumbing component, and
    wherein the plastic connector has a first end flush with a first end of the metal spout at the first end of the plumbing component, and the plastic connector has a second end contacting the stop.

18. A plumbing component capable of quick connection to a plastic drainage pipe, the plumbing component comprising:
    a hollow metal spout defining a stop and an attachment area; and
    a hollow plastic connector attached to the metal spout so that the plastic connector is in contact with the stop and the attachment area of the metal spout,
    wherein the plumbing component has a first end to be bonded to the plastic drainage pipe and a second end opening directly to an exterior of the plumbing component,
    wherein the plastic connector and the metal spout are configured and arranged so as to form an unobstructed passage for drainage through the plumbing component from the first end to the second end,
    wherein the plastic connector is cylindrical,
    wherein the plastic connector is arranged within the metal spout so that an outer circumferential surface of the plastic connector directly contacts the metal spout, and
    wherein the first end of the plastic connector is flush with an end of the metal spout at the first end of the plumbing component.

* * * * *